United States Patent [19]

Schwenninger

[11] 4,260,407

[45] Apr. 7, 1981

[54] GAS CUSHIONED ICE SKATE EDGE STRETCHER

[75] Inventor: Ronald L. Schwenninger, Ridgeley, W. Va.

[73] Assignee: PPG Industries, Inc., Pittsburgh, Pa.

[21] Appl. No.: 41,272

[22] Filed: May 21, 1979

[51] Int. Cl.³ .............................................. C03B 18/06
[52] U.S. Cl. ...................................... 65/99 A; 65/182.4
[58] Field of Search .......................... 65/99 A, 182 R; 264/289.3, 289.6, 284

[56] References Cited

U.S. PATENT DOCUMENTS

| | | | |
|---|---|---|---|
| 3,440,030 | 4/1969 | Thompson | 65/99 A |
| 3,468,651 | 9/1969 | Boaz | 65/91 |
| 3,468,652 | 9/1969 | Beck | 65/91 |
| 3,487,659 | 6/1970 | Ito et al. | 65/25 |
| 3,563,720 | 2/1971 | Ito et al. | 65/99 A X |
| 3,594,143 | 7/1971 | Mohyuddin | 65/99 A X |
| 3,998,616 | 12/1976 | Farabaugh | 65/99 A X |

*Primary Examiner*—Arthur D. Kellogg
*Attorney, Agent, or Firm*—Dennis G. Millman; Paul A. Leipold

[57] ABSTRACT

Method and apparatus for edge control of glass in the forming chamber. The invention utilizes a blade that is cushioned by gas discharged from its lower edge. The gas cushioned blade does not directly contact the glass thereby minimizing cooling and wear problems common to such control devices.

20 Claims, 13 Drawing Figures

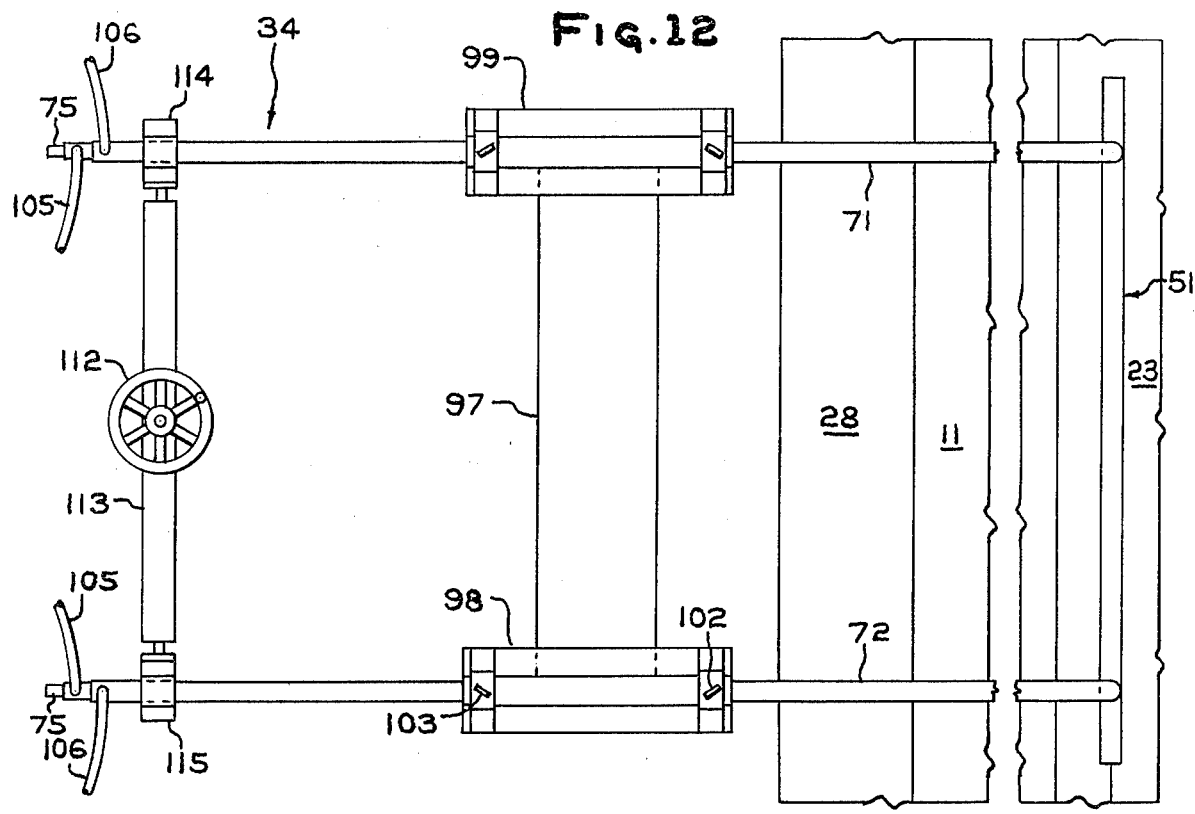
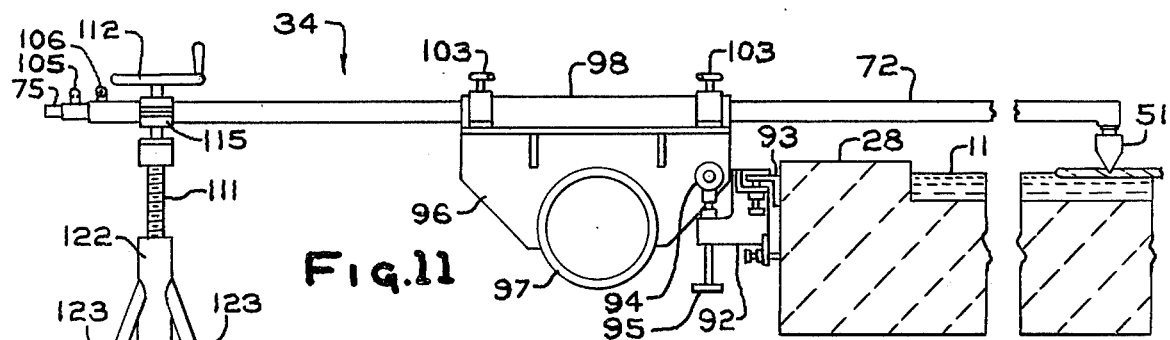
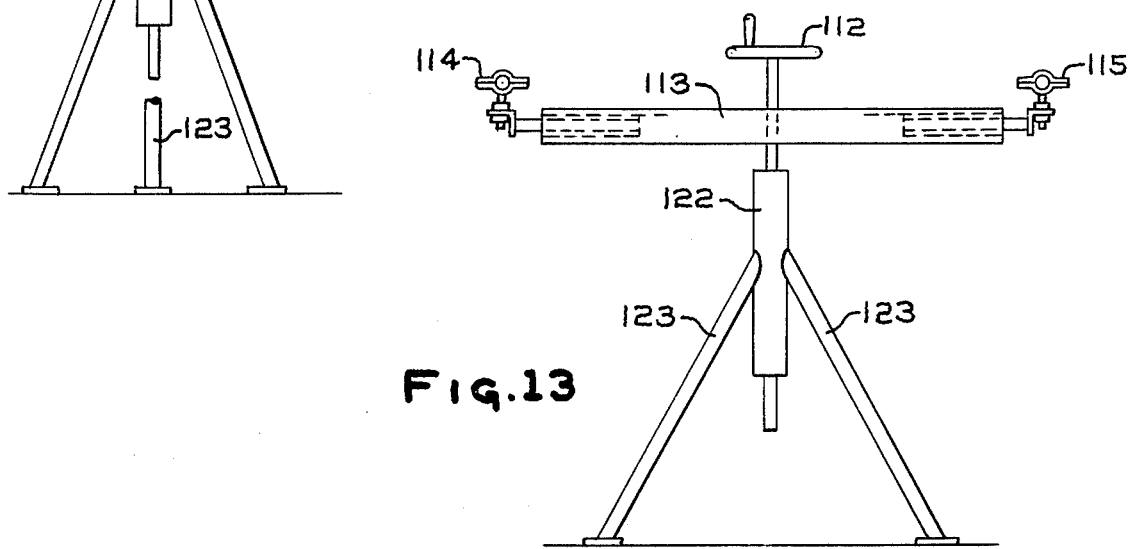

GAS CUSHIONED ICE SKATE EDGE STRETCHER

BACKGROUND OF THE INVENTION

1. Field of the Invention

This invention relates to a method and apparatus for applying force to molten glass being formed into a continuous sheet of glass while floating on molten metal. More particularly the invention relates to a method and apparatus for more efficient regulation of forces to either spread the glass to thinner than equilibrium conditions or prevent the glass from becoming as thin as in equilibrium conditions.

2. Discussion of the Prior Art

It has been conventional practice in the float glass formation art to utilize knurled or toothed rollers arranged in pairs along the margins of the glass ribbon as it passes through the forming chamber to apply forces to the margins of the ribbon in order to form the ribbon into either greater or less than equilibrium thickness. The use of such rollers while resulting in satisfactory glass presents difficulties in that the rollers provide only point contact with the molten glass. Therefore, the molten glass is pulled inward between the roller members and then again is pulled outward as it passes each roller member. This creates unwanted distortions in the glass. Further, the series of edge control rolls on each side of the forming chamber require a large amount of coolant flow in order to cool the rollers and also there is a need for rotary seals in the water cooling system which are a source of difficulty. There is in addition, a need for a drive motor for each edge control roll and tachometers to allow reading of the speed of each roller in order to control its effect on the glass ribbon. Changes in the treatment of the glass by the rollers is difficult in that each roller must be individually adjusted as to angle and speed such that they may exert a combined effect in changing the equilibrium glass thickness of the ribbon. Therefore, there remains a need for improved edge control devices.

It has been proposed in U.S. Pat. No. 3,468,651 to Boaz that longitudinally arranged pipes having blades formed thereon be positioned along the edge portions of glass ribbon floating on the molten tin in the forming chamber. The blades would be stationary relative to the direction of the glass movement and could be adjusted to provide lateral stretching of the glass. Water cooled stationary blades are not particularly satisfactory as there is a tendency for the blades to stick to the glass as they are formed of metal. Further, the wear of the blades is high and the cooling provided by the blades to the glass creates additional distortional forces in the glass ribbon.

U.S. Pat. No. 3,563,720 to Ito et al discloses an edge control means comprising a refractory material having groove like cavities which is pressed down on the margins of a glass ribbon as it passes through the forming chamber. The refractory member of Ito may be porous and provided with means for discharging gases from the refractory control means against the glass. This device and method present problems in that the porous refractory is subject to plugging of the pores through which the gases are delivered. A further problem is that the tractive force available from the design having only grooves in the bottom portion is not sufficient in all cases to provide the grip needed to provide less than equilibrium thickness glass. The edge control device of Ito, et al is in contact with the tin which may lead to several kinds of difficulties including plugging of the pores of the refractory, contamination of the bath and decreases in the life of the edge control means.

Therefore, there remains a need for an edge control device that will not suffer from the disadvantages and low efficiency of the previous designs. The construction and maintenance of several banks of rollers requiring cooling and regulation means is expensive and limits the amount of other controls which may be allowed access to the furnace. Further, there is a need for edge control means which will decrease the amount of distortion which is caused in the glass by the uneven stretching of edge control rollers.

SUMMARY OF THE INVENTION

It is an object of this invention to overcome the disadvantages of the prior processes and apparatus.

It is an additional object to produce flatter glass sheet.

It is another object to provide a mechanism for changing the thickness of float glass which does not limit access to the furnace.

It is a further additional object to provide float glass of low optical distortion.

It is another further additional object of this invention to provide apparatus for edge control which is low in maintenance and cost.

It is again an object of this invention to provide more stretch or inhibition of float glass per control device.

These and other objects of the instant invention are generally accomplished by the utilization in a float glass forming chamber of a gas cushioned blade oriented generally in the direction of the advancing glass and having gas issuing from its lower portion to form a continuous barrier to contact of the blade with the glass as the action of the gas cushioned blade forms the glass to other than equilibrium thickness or stabilizes the glass during formation to equilibrium thickness.

In a preferred embodiment the blades are arranged in pairs on opposite margins of the advancing glass ribbon. The blades are preferably formed of carbon or graphite and have forming gas, such as nitrogen, issuing from small holes in the bottom of the blade to provide the cushion. The blades are angled at the upstream end in the manner of an ice skate where the glass first is grooved by the presence of the gas cushioned blade. The gas cushioned blade does not extend below the lower surface of the glass ribbon when in use.

BRIEF DESCRIPTION OF THE DRAWINGS

FIGS. 8, 9 and 10 also illustrate the action of the blade upon the glass margin.

FIG. 11 is a diagramatic fragmentary cut away view of part of the apparatus of FIG. 1 illustrating the operation of the apparatus of the invention including mounting means exterior of the forming chamber.

FIG. 12 is a view from the upper portion of the means for control of the gas cushioned blade of the invention.

FIG. 13 is a view toward the forming chamber of the control mechanism for the control of the gas cushioned blade of the invention.

DETAILED DESCRIPTION OF THE INVENTION

The instant invention offers many advantages over prior art methods and apparatus for stretching float glass. The method and apparatus of the invention allows the stretching to be carried out over a wide portion of the margin of the advancing glass thereby minimizing distortions caused by point forces stretching the glass. Further, the operation of the device of the instant invention is simpler and therefore less expensive. It requires no motors and it requires no rotary seals for cooling. The device requires no tachometer to control the speed. As there is substantially no contact between the molten glass and the control device there is very little wear of the blade giving it a long life. Additionally, the system of the invention produces less peak stress in the glass than prior systems where point contacts stretched the glass. It is theorized that the system of the invention produces less distortion in the glass as the pulling of the gas cushioned blade over a wide portion of the margin gives less distortion compared with the pulling at one point of a roller. Other advantages of the system of the invention will become clearer from the description of the drawings which follows.

Figure 1:
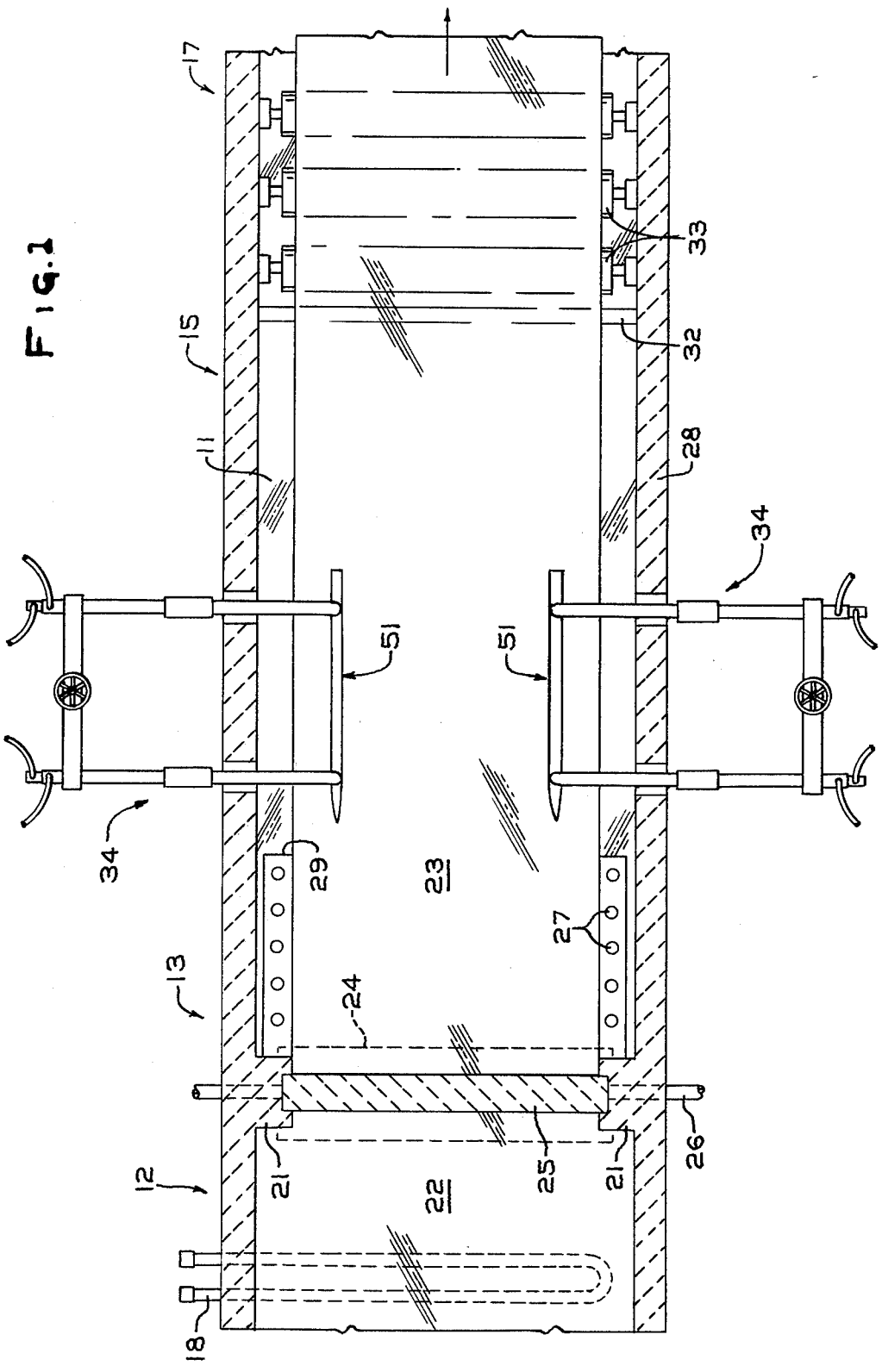
FIG. 1 is a plan section of the apparatus of the invention employing a tank structure for the float formation of the glass ribbon.

Referring now to FIG. 1 there is shown a flat glass-making apparatus including a glass furnace or tank terminating in a refiner 12 to which there is connected a molten glass delivery means 13, which in turn is connected to a glass forming chamber 15. This view in FIG. 1 is a plan view with the top of the furnace removed. Molten glass 22 in the refiner 12 is delivered onto a pool of molten metal 11 in the glass-forming chamber 15. This glass is then cooled and stretched to form a dimensionally stable continuous sheet of flat glass which, in turn, is taken from the forming chamber 15 by the take-out apparatus 17. Molten glass 22 in the refiner 12 is generally conditioned for delivery and forming by being cooled, for example, by a submerged cooler 18, as shown.

Molten glass 22 is caused to flow, in a preferred embodiment of this invention, over a threshold 24 directly onto the molten metal 11. The present invention is, however, not limited to including this particular delivery means and alternatively glass may be delivered by a delivery means such as described in U.S. Pat. No. 3,220,816, wherein the glass is delivered down the long canal over a lip and caused to fall onto the pool of molten metal where it is generally permitted to spread. The threshold 24 is generally provided with means for cooling such as cooling pipes 26 embedded in the threshold traverse to the movement of glass over the threshold. In addition to the threshold 24, the delivery means 13 also included side members of jambs 21 that define the side boundaries of the channel through which molten glass may flow. The delivery means 13 further includes a metering member or tweel 25 extending downwardly toward the threshold 24. The tweel 25 engages the molten glass and controls the cross-sectional area of space defined by the tweel, threshold and jambs through which molten glass may flow onto the molten metal 11 in the forming chamber.

The forming chamber 15 includes a pair of sidewalls 28. In a preferred embodiment of this invention, the sidewalls 28 are generally parallel to one another and parallel to the direction of glass movement, as shown by the arrow in FIG. 1. Nevertheless, the present invention is applicable to a forming chamber having a conventional "shoulder" structure. The forming chamber includes a roof portion, not shown. The roof portion and the upper sidewalls, not shown, form on the ends of the chamber a space above the molten metal which is an atmosphere space, filled with a protective atmosphere to prevent oxidation of the molten metal. The gases in the atmosphere may be inert gases, reducing gases, or a combination of inert and reducing gases. The forming chamber includes a bottom or container portion which contains the molten metal bath 11. The bottom portion includes the side portion 28 extending above the elevation of the surface of the molten metal in the chamber. The bottom portion is generally supported on a structure beneath the forming chamber. The roof portion, not shown, and, the upper sidewalls, not shown, generally define a single structure that is suspended from supporting members extending above the chamber. A space relatively free of structural members separates the upper sidewalls from the bottom portion sidewalls 28 of the chamber substantially along the length of the chamber. This space is sealed during operation of the furnace but is sufficiently accessible to provide a plurality of locations from which devices may be extended into the forming chamber from outside the chamber or to provide locations for observation windows along the length of the float forming chamber. Inside the forming chamber 15 there may optionally be located guide members 29 extending from the vicinity of the delivery provided with means 27 for controlling their temperature, such as heaters or coolers. Electric heaters are useful for controlling the temperature of such guides.

At the downstream end of the forming chamber 15 is an end dam or lip 32, which serves to contain the molten metal within the forming chamber and to separate the forming chamber 15 from the take-out apparatus 17. The take-out apparatus 17, generally housed within a structure adjacent the forming chamber, comprises take-out rolls 33, which serve to lift a continuous sheet of glass up from the molten metal and apply tractive forces to the glass to convey it out through the forming chamber into a lehr or other conventional processing equipment. In addition to the take-out rolls 33, the take-out apparatus generally includes a seal, not shown. The seal will usually be one or more flexible heat resisting curtains of fiber material such as silica cloth curtain, hanging down from a roof portion of the structure above the take-out rolls down to a location for contacting a continuous sheet of glass being drawn from the chamber.

The applicant recognizes that the term "bath" has at times been used in the art to mean the pool of molten metal on which the glass is formed and at other times to mean the forming chamber when the glass sheet formation takes place on the molten metal bath. However, in this specification, the applicant intends to refer to the structure as the forming chamber and only use the term "bath" to refer to the pool of molten metal. The terms "ribbon" and "sheet" are used interchangeably to refer to the strip of glass formed on the bath in the forming chamber. The directions "upstream" and "downstream" are defined by the direction of glass flow through the process; that is, glass flows from an upstream portion of the glassmaking apparatus toward a downstream portion of the glassmaking apparatus.

The instant system is supported external to the forming chamber itself by a device such as means 34. These support means 34 are shown mounted on the forming chamber. Each support means may be mounted on hanger, on rails or for movement on a wheeled support. The device as detailed in FIGS. 11, 12 and 13 is particularly desirable for the instant invention, but other devices for holding, cooling, and applying forces to equilibrium thickness changing devices or edge control devices are known in the art. Reference may be had to U.S. Pat. Nos. 3,929,333, May et al, and 3,713,797, Lawrenson, for descriptions of support devices.

Figure 2:
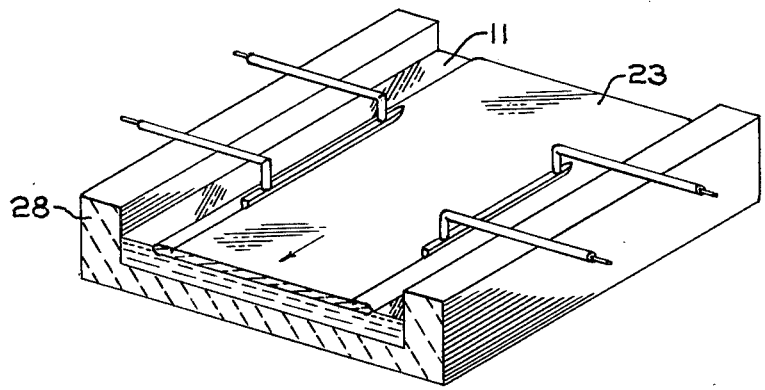
FIG. 2 is a diagramatic fragmentary cut away view of part of the apparatus of FIG. 1 illustrating the operation of the invention.
Figure 3:
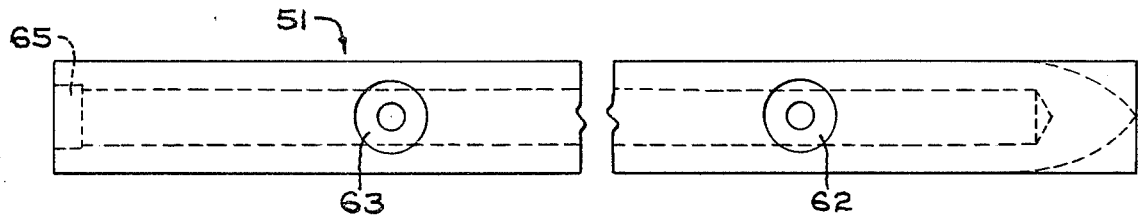
FIG. 3 is a top view of a blade in accordance with the invention.
Figure 4:
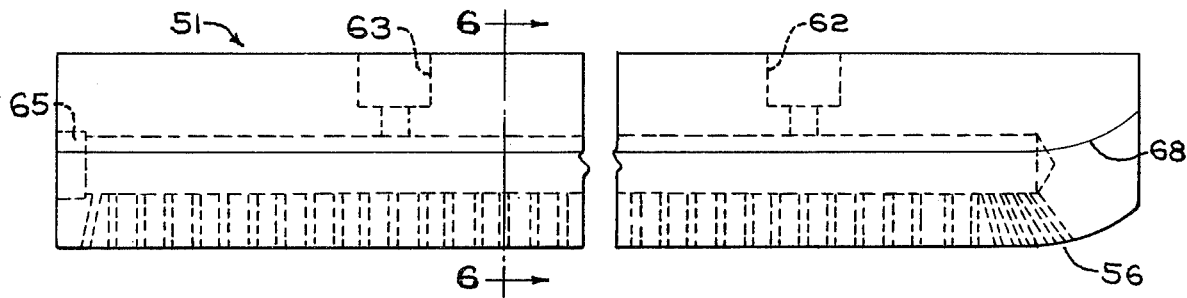
FIG. 4 is a side view of a blade in accordance with the apparatus of the invention.
Figure 6:
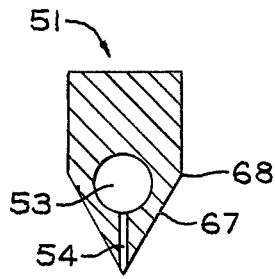
FIG. 6 is a cross-section at line 6—6 of FIG. 3.

With reference to FIGS. 1 and 2 of the instant invention there is illustrated the gas cushioned blade 51 which is suspended within the forming chamber 15 by control mechanism 34. The gas cushioned blade 51 may be angled in a manner described below to cause forces to be applied to the glass to either form glass of greater than or less than equilibrium thickness. The devices, as is conventional practice are equipped with cooling channels to provide coolant to the arm devices 72 holding the device into the glass. Further the arm devices of the instant invention are provided with channels for the cushioning gas to reach an exit from the gas cushioned blade. The apparatus for controlling the placement of the gas cushioned blade may be better seen by reference to FIGS. 11 through 13. The device itself, as illustrated in FIGS. 3 through 6, is discussed below.

Referring to FIGS. 3 through 6, the gas cushioned blade of the invention is provided with a gas supply gallery or manifold 53. The cushioning gas from gallery 53 exits through channels 54 leading to holes 55 which are closely placed on the lower pointed surface of the gas cushioned blade. The upstream portion of the blade is angled or turned upward in the manner of an ice skate to channel the advancing glass beneath the blade without build-up or sticking. Although illustrated as an arcuate upturn the upturned portion could also be formed by one or a series of planar upturned surfaces. The upturned portion 56 is also provided with the holes 55 from which the cushioning gas exits. The cushioning gas enters the blade through at least one and preferably both of access and hold down holes 62 and 63. Indicated at 65 is a plug for plugging the hole where the gallery 53 was drilled.

The holes 55 and channels 54 leading thereto may be of any size and spacing which results in good cushioning of the blade with substantially no contact of the glass with the blade material itself. In one embodiment a spacing at quarter inch intervals of 1/32" holes has been found to be suitable. However, the spacing and size of the holes may be varied in any manner desired.

The blade 51 may be formed of any suitable material. Materials with good stability at the temperature of molten glass and those not wetted by the glass are desirable. Among typical suitable materials are boron nitride, fused silica, stainless steel, and mild steel, although mild steel is most suitable for the lower temperature portions of the forming chamber. A preferred material is carbon or graphite as it may be easily worked, is temperature resistant, and is not easily wet by glass in the event there is contact between the gas cushioned blade and the glass.

Figure 7:
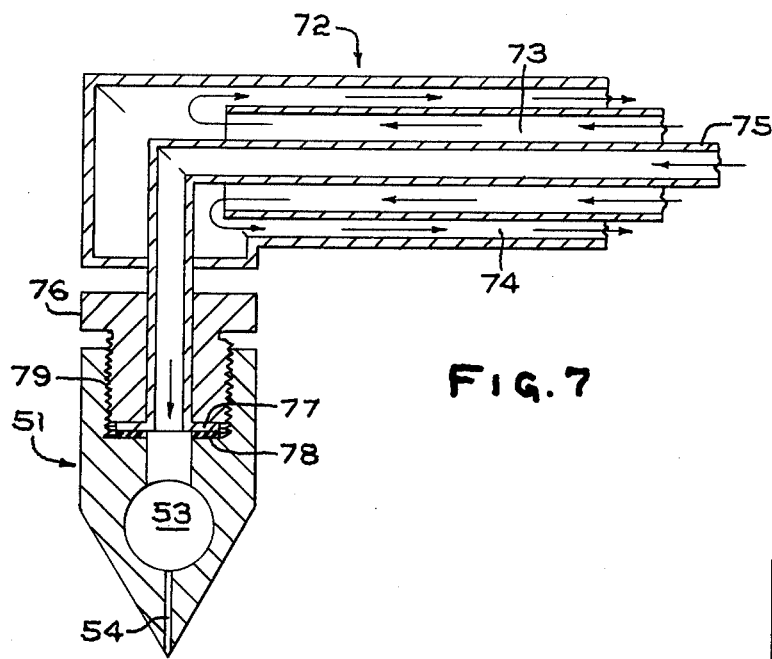
FIG. 7 is a fragmentary cross section of a portion of the support arm of the apparatus of the invention and a cross-section of the attachment of the support arm to the gas cushioned blade.

With reference to FIG. 7 there is illustrated in detail the relationship of the blade 51 and one of the arms 72 which provide both control of the blade and furnish the necessary fluids to the blade. Also shown therein are details of the method of fastening the blade to the arm 72 in such a manner that the angle of the blade may be regulated. Arm 72 comprises channels for liquid coolant to cool the arm during its placement in the forming chamber. The coolant enters channel 73 and exits through channel 74. The coolant fluid is ordinarily water. Further there is provided access for gas for cushioning for the blade through inner pipe 75, which leads to gallery 53. Control arm 72 is attached to blade 51 by graphite nut 76 which is screwed into the skate 51 using thread 79. Nut 76 holds down flange 77, which is at the end of the gas pipe 75, against packing 78. This allows movement of the flange 77 when the arm 72 is moved for adjustment of the angle of the blade 51 to the direction of movement of the glass. The blade or blades generally are angled either with the upstream end outward to make glass of greater than equilibrium thickness or with the upstream end inward to make glass of less than equilibrium thickness. However, even when forming glass of equilibrium thickness it is helpful to have the blades to stabilize the glass ribbons course as it passes through the forming chamber, thereby minimizing the chance of it touching the sides.

The gas which is furnished to gallery 53 for cushioning of blade 51 may be any gas which does not adversely affect the glass formation. A preferred gas is forming gas which, as is known, is predominantly nitrogen with traces of hydrogen. However, any gas which does not adversely affect the glass or molten tin may be utilized. The utilization of forming gas is convenient as such gas must be added to the forming chamber and addition through the gas cushioned blade of at least some of the gas is convenient. If desired the gas may be preheated to avoid excessive cooling of the glass.

The gas cushioned blade may be utilized in pairs on opposite margins of the glass. The blades may be any desired length. A length from about two feet to eight feet (about 0.5 to about 2.5 meters) is suitable. It is conceivable that the entire edge of the glass in the area where it is viscous could be lined with the blades. The blade may be located any distance from the edge which provides suitable grip for the blade. Conventionally, this distance would be between about 3" (about 7 cm) and about 6" (about 15 cm) from the edge. The blade would be utilized from the beginning of the area where the glass enters the forming chamber down to where the temperature is about 1400° F. (about 760° C.).

While the gas passages have been illustrated in the form of holes it is within the system of the invention to utilize gas passages of any suitable shape. Among other suitable shapes would be slots, or combinations of slots and holes.

The lower portion of the blade may be any shape which gives a good grip on the glass. Generally, the sharper the point the better for gripping of the glass. However, the need for a sharp point must be balanced against the fact that if the point is formed too sharp it is fragile, also, there is greater difficulty in providing an air cushion to a very narrow point.

Figure 5:
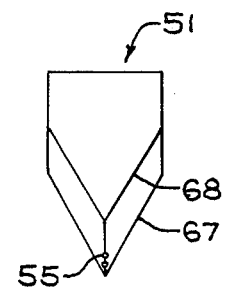
FIG. 5 is an end view of the rounded upstream end of the blade.
Figure 8:
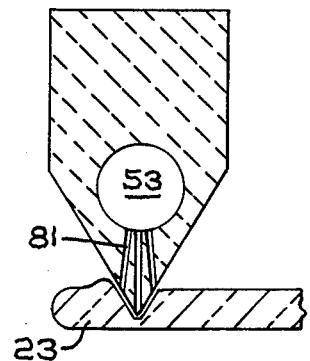
FIGS. 8, 9 and 10 are cross-sections of alternate constructions of the gas cushioned blade of the invention.
Figure 9:
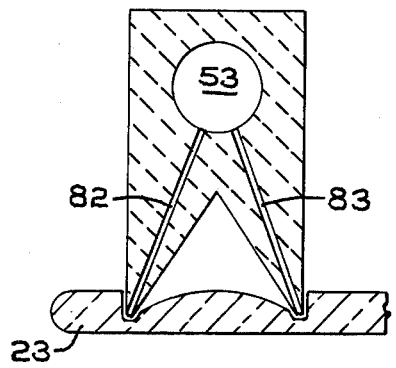
Figure 10:
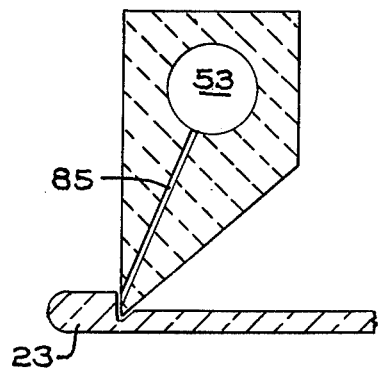

As illustrated in FIGS. 8, 9 and 10 the blade may be of alternate cross-section construction. The blade of FIG. 8 has several gas passages, but essentially the same cross-section as the blade of FIG. 6. The blade of FIG. 9 has two points with each having a gas supply. The blade of FIG. 10 is angled and further has the gas supply 85 directed towards the outer margin of the glass in the area where the force of the glass being stretched to less than equilibrium thickness is the greatest. The blade of FIG. 10 is a desired structure in that it provides good working area surface for the cushion against the strain of the glass as it is reduced to less than equilibrium thickness. The blade of FIG. 10 is less versatile in that without being reversed it is not as effective in producing of greater than equilibrium thickness. The exits of the gas passages in the gas cushioned blade are generally located at or near the point of the blade for best performance. As illustrated in FIG. 5, the angle of the blade 67 away from the point to 68 may be any angle which provides a strong edge and has an effective working shape on the glass. The area 67 could also be concave or convex.

Referring to FIGS. 11, 12, and 13 there is shown a preferred control mechanism for the system of the instant invention. It is noted that the control system of the instant invention does not require rotary seals for the cooling fluid or an electric motor for continuous drive. The controlling mechanism generally indicated as 34 is mounted to the forming chamber by mounting bracket 92 which is fastened to plate 93 which is attached to the forming chamber 13 through wall 28. The arms 71 and 72 are extended through hold down devices 98 and 99 which have clamps 102 and 103 which are adapted to hold the hold down devices 71 and 72 in a predetermined position. The hold down devices 98 and 99 are mounted on a bracket 96 which in turn is fastened to the cylindrical heavy structural member 97 which is pivoted on pivot point 94. The height of pivot point 94 is adjusted by screw means 95. By adjustment of the height of pivot point 94 by screw 95 the amount of bite of the gas cushioned blade 51 may be regulated. Bite may be defined as the depth the edge control device is below the surface of the glass. The amount of bite further may be regulated by adjustment of screw 111 by turning of wheel 112 to raise or lower the outer portion of 71 and 72. The outer portions of the elongated members 71 and 72 are held by clamps 114 and 115 respectively which are pivoted in the bridging member 113 which is fastened to the vertical control device 111. The screw control device 111 may be turned by wheel 112 to raise and lower from tripod device 122 which is supported by legs 123.

To provide angle to the blade 51 to either impart a stretching to less than equilibrium thickness or to inhibit spread the elongated devices 71 and 72 are adjusted to different positions in locking hold down devices 98 and 99 such that they extend different lengths into the forming chamber. When 71 and 72 extend different lengths into the forming chamber blade 51 is angled as the elongated member pivots on flange 77 that is held in the blade 51. It is apparent that the instant apparatus for control for the air cushioned blade provides good adjustment as the height is adjusted both at screws 111 and 95 and further the action of the blade is kept uniform by the horizontal joining member 113 and 97. The gas is supplied to the blade by inlets 75 while water inlet 105 and outlet 106 provides cooling to the elongated 71 and 72 as they hold the blade 51.

As will be apparent to those skilled in the art the present system may be modified and equivalent elements or processes may be employed in combination therewith without departing from the spirit of this invention. For instance, the novel system of the invention might be employed on one side of the forming chamber in combination with several conventional roller wheel type thickness control devices on the other side of the forming chamber. Also several of the longitudinally orientated gas cushioned blades of the invention might be employed in series rather than as illustrated in a single control device. Further, it is within the invention that the mechanism for the angling of the blade be modified such that the blade was suspended from a single point with a gear device at that point to adjust the angle. Such a suspension system would be particularly suitable for short air cushioned blades. However, as above set forth the longer blades of the instant invention provide greater contact and are preferred as less distortion of the glass results by longer control means. The system further would be suitable for the float forming of plastic sheet materials. The blades of the invention also are suitable for use in the curtain coating process for plastic polymeric materials. The blades also find use in controlling the thickness of polymer or other viscous materials that are formed on a moving belt carrying the polymer beneath the blades.

While the present invention has been described with reference to certain specific embodiments thereof, it is not intended to be so limited thereby. Rather the invention is set forth in the accompanying claims.

I claim:

1. A method of manufacturing float glass comprising delivering molten glass at a controlled rate to a molten metal bath, forming an advancing layer of molten glass in ribbon form, controlling the location of a margin of the glass ribbon by means of an elongated blade extending in the direction of glass travel, wherein the glass is penetrated by a tapered, lower edge of the blade, and delivering pressurized gas through an open conduit to open port means extending through the blade to the vicinity of the lower extremity of the lower edge of the blade from which the pressurized gas is released at sufficient pressure to form a lubricating film of gas between the glass and substantially the entire penetrated portion of the blade, so that the glass slides freely under the blade.

2. The method of claim 1 wherein said gas issuing from said blade is forming gas.

3. The method of claim 2 wherein said gas is preheated to minimize glass cooling.

4. The method of claim 1 wherein said blade comprises carbon or graphite.

5. The method of claim 1 wherein the lower edge of said blade is turned up at its upstream end.

6. The method of claim 1 wherein the majority of said gas issuing from said blade is on the side of said blade toward the outer edge of said glass ribbon.

7. The method of claim 1 wherein said blade comprises a series of blades along each margin of said glass ribbon.

8. Apparatus for forming glass comprising a tank structure holding a bath of molten metal for supporting a ribbon of molten glass as it is advanced on the surface of the molten metal, thickness control means comprising an elongated blade extending generally in the direction of glass travel and having a tapered, lower edge oriented so as to penetrate into a margin of the glass, the blade including an open gas supply conduit in communication with a source of pressurized gas, and port means extending from the gas supply chamber to substantially the lower extremity of the lower edge of the blade whereby a stream of gas is released closely adjacent to the lower extremity of the blade to form a lubricating layer between the glass and substantially the entire penetrated surface portion of the blade.

9. The apparatus of claim 8 wherein said blade has the upstream end turned upward.

10. The apparatus of claim 8 wherein said blade is angled to form said glass to less than equilibrium thickness.

11. The apparatus of claim 8 wherein said blade comprises carbon or graphite.

12. The apparatus of claim 8 wherein said port means comprise a multiplicity of discrete orifices from which gas issues to form the gas layer beneath the blade.

13. The apparatus of claim 12 wherein said discrete orifices comprise holes.

14. The apparatus of claim 12 wherein said discrete orifices comprise slots.

15. The apparatus of claim 8 wherein said elongated blade member is supported by at least one elongated member extending into said tank structure.

16. The apparatus of claim 15, wherein said blade is supported by at least two elongated members and said elongated members extend into said tank structure and are connected to each other at least at one point on each and held in substantially rigidly parallel relation.

17. The apparatus of claim 16 wherein one of said parallel elongated members may be extended further into said tank structure in order to angle said blade with respect to the direction of glass movement.

18. The apparatus of claim 15 wherein said support means for said elongated blade member allows movement of said blade vertically.

19. The apparatus of claim 8 further comprising means to preheat said gas issuing from said blade.

20. The apparatus of claim 8 wherein said port means comprise an elongated slot.

* * * * *